(12) United States Patent
Stokes

(10) Patent No.: US 6,509,996 B2
(45) Date of Patent: Jan. 21, 2003

(54) POSITIONING ASSEMBLY INCLUDING A THERMALLY DE-COUPLED TORQUE MOTOR AND SYSTEM INCORPORATING THE SAME

(75) Inventor: Brian P. Stokes, Windham, NH (US)

(73) Assignee: Nutfield Technology, Inc., Windham, NH (US)

( * ) Notice: Subject to any disclaimer, the term of this patent is extended or adjusted under 35 U.S.C. 154(b) by 0 days.

(21) Appl. No.: 09/891,477

(22) Filed: Jun. 26, 2001

(65) Prior Publication Data

US 2002/0196513 A1 Dec. 26, 2002

(51) Int. Cl.[7] .............................................. G02B 26/08
(52) U.S. Cl. ........................ 359/198; 359/214; 359/223
(58) Field of Search .................................. 359/198, 199, 359/200, 212, 213, 214, 225, 226, 223

(56) References Cited

U.S. PATENT DOCUMENTS 4,388,964 A * 6/1983 Almgren et al. ............. 165/103
5,575,828 A * 11/1996 Dutto et al. ............ 198/468.01

* cited by examiner

Primary Examiner—Mark A. Robinson
(74) Attorney, Agent, or Firm—Grossman, Tucker, Perreault & Pfleger, PLLC

(57) ABSTRACT

A positioning assembly including a motor, a position sensor, an isolator for coupling the motor to the sensor. The motor may have all surface areas, except that surface area coupled to the sensor via the isolator, exposed to a cooling medium such as air. In an exemplary embodiment, the present invention may be utilized in an optical scanning system.

17 Claims, 2 Drawing Sheets

POSITIONING ASSEMBLY INCLUDING A THERMALLY DE-COUPLED TORQUE MOTOR AND SYSTEM INCORPORATING THE SAME

FIELD OF THE INVENTION

The present invention relates to a positioning assembly incorporating a torque motor, and, in particular, to a positioning assembly including a torque motor coupled to a position sensor enabling better heat dissipation from the motor.

BACKGROUND OF THE INVENTION

Torque motors are widely used for a variety of applications. One application is the use of a torque motor, in combination with a shaft position sensor, in a positioning assembly for positioning optical elements in order to guide light beams. The optical element can be a lens, mirror, waveplate, or the like. This type of device is often called an optical scanning galvanometer or optical scanner.

In operation, a light source directs light toward the optical element. The optical element reflects the light in desired directions depending on the task to be accomplished. The optical element is typically attached to the output shaft of the torque motor, which provides the necessary torque to drive the optical element. The position of the motor output shaft and optical element is sensed by a position sensor connected to the motor, and controlled, e.g. by a software application, based on the sensor output.

In a typical prior art configuration, the motor has its output shaft directly connected to the optical element on one end, and the position sensor coupled to the motor on the other end. In addition, the motor typically has a bracket connected to it to support the system. Thus, the motor is disposed between the output shaft/optical element combination and the position sensor. A problem with this configuration is that heat generated by the motor may be transferred directly to the position sensor, adversely affecting its performance. The heat generated by the motor may also be transferred to the connecting bracket, thereby causing expansion of the bracket and further adverse performance effects. For example, motor heat dissipation may result in unacceptable position drift in the system such that the speed and accuracy of the optical scanning system are hampered.

Accordingly, there is a need in the art for a positioning assembly including a thermally de-coupled motor configuration that enables better heat dissipation and reduces position drift in optical scanning systems.

BRIEF SUMMARY OF THE INVENTION

A positioning assembly for controlling the position of an element consistent with the invention includes: a motor having an output shaft coupled to the element; a position sensor; and a thermal isolator disposed between the motor and the sensor, the output shaft extending through the isolator and through at least a portion of the sensor. In one exemplary embodiment, the present invention may be utilized in an optical scanning system wherein the element to be positioned is an optical element for directing light from a light source. In optical scanning applications, the thermally de-coupled torque motor and position sensor permit enhanced heat dissipation from the torque motor, thereby reducing adverse thermal affects on the system.

A method of constructing a positioning assembly for positioning an element consistent with the invention includes: providing a motor having an output shaft; coupling the element to the output shaft; providing a thermal isolator; and coupling a position sensor to the motor with the output shaft extending through the isolator and the at least a portion of the sensor.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
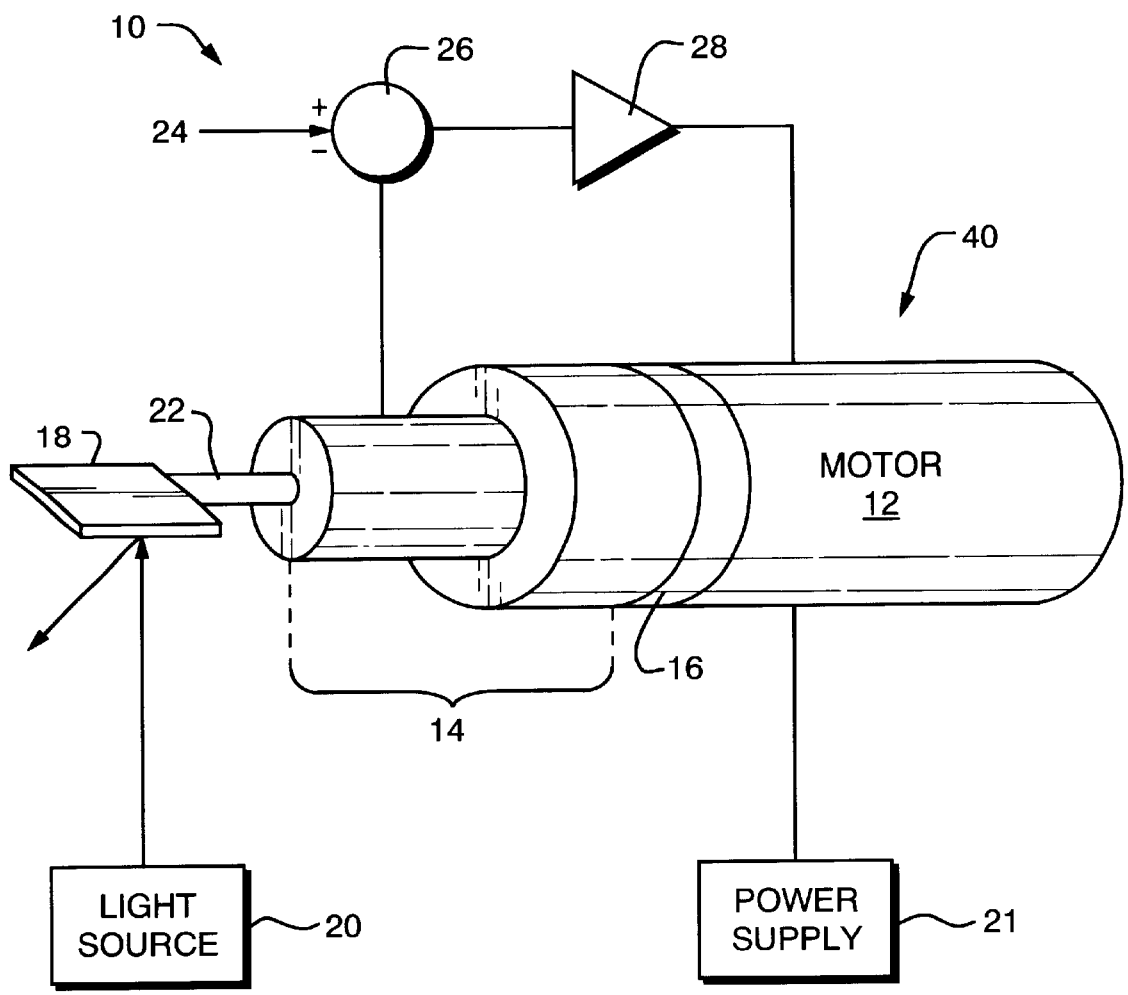
FIG. 1 is a schematic view of an exemplary optical scanning system including a positioning assembly consistent with the invention.

With reference now to FIG. 1, there is shown an exemplary positioning assembly 40 for use in an optical scanning system 10. It will be recognized by those skilled in the art that FIG. 1 illustrates just one application of the novel positioning assembly configuration, and such configuration may be used in a wide variety of applications. In the illustrated exemplary embodiment, the positioning assembly includes: a motor 12 having an output shaft 22, a thermal isolator 16 disposed at one end of the motor, a position sensor 14 separated from the motor by the isolator, and an optical element 18 coupled to the output shaft 22. The optical scanning system 10 further includes a light source 20, and a power supply 21.

The motor 12 may be any type, such as a moving coil design, a moving iron pole construction, and a moving magnet type, and is driven by current from the power supply 21. In the exemplary embodiment of FIGS. 1 & 2, a moving magnet motor is shown. The motor has a rotor comprised of a magnet 30 coupled to the output shaft 22.

The output shaft extends through associated openings in the isolator 16 and the position sensor 14, and is coupled to the optical element 18. The optical element may be a lens, mirror, waveplate, or the like used to reflect light from the light source 20. The light source may be a laser, photodiode, or the like. In a known manner, a subtraction circuit 26 may be connected to the feedback output of the position sensor 14, and to the input of an amplifying circuit 28. An input signal, e.g. from a software positioning application, may be applied to an input 24 of the circuit 26, which compares the signal with the feedback signal from the sensor. The feedback signal is representative of the position of the output shaft and generated in a known manner by the sensor in response to the rotating motion of the output shaft. The output of the circuit 26 is amplified and used to drive the torque motor 12. The torque motor rotates the output shaft, which in turn rotates the optical element, causing it to reflect light from the light source 20 to act on a work surface area.

Advantageously, the motor is coupled to the position sensor 14 via the intervening isolator 16. The isolator is preferably constructed from a thermally insulating material. Examples of thermally insulating materials include, but are not limited to, ceramics and plastics. With respect to plastics, the thermally insulating material may comprise either a thermoplastic or a thermoset plastic. Generally, a thermoset plastic is preferred to a thermoplastic given its increased thermal stability. The isolator may be fixed to the motor and position sensor by various methods known to those skilled in the art, e.g. by bonding or adhesive bonding. The isolator can be of varying thickness t, and in an exemplary embodiment has a thickness of 0.125 inches.

Figure 2:
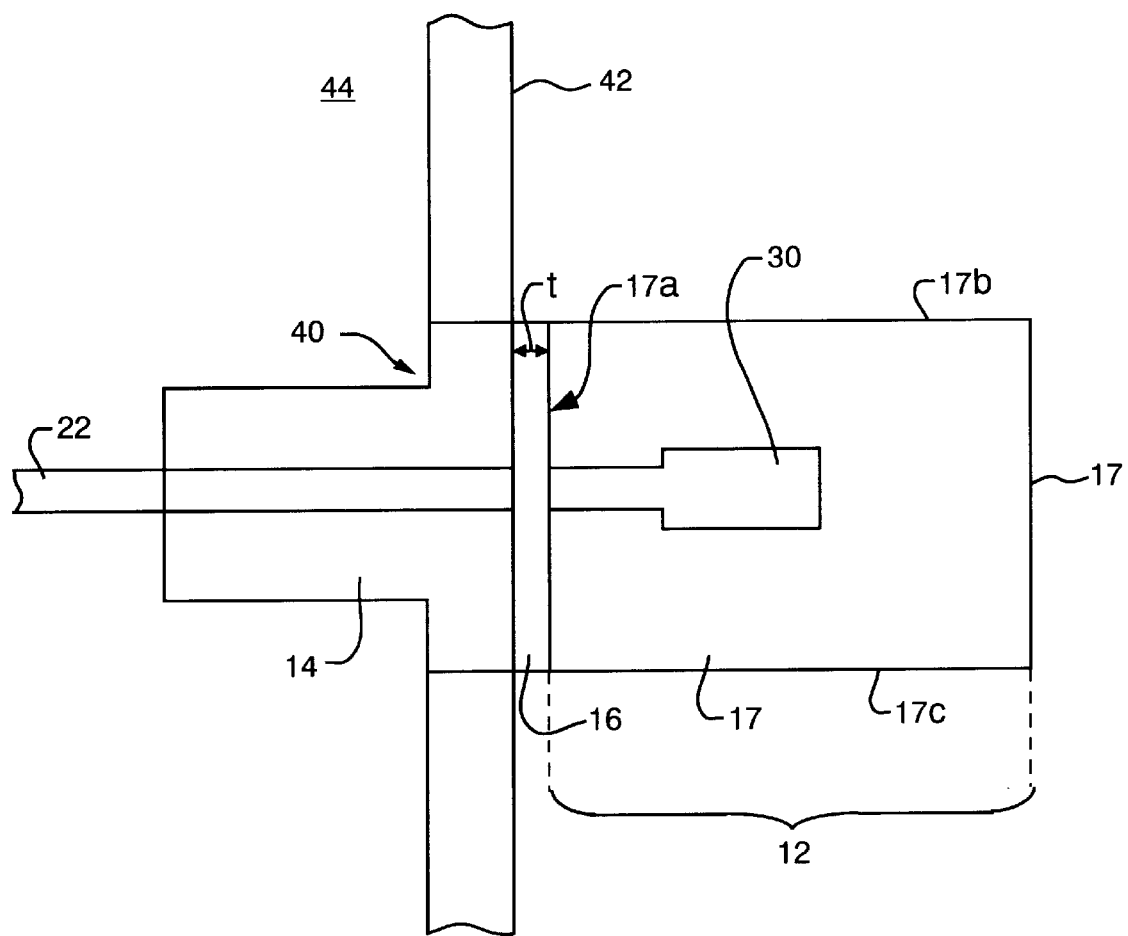
FIG. 2 is a cross sectional view along the longitudinal axis of a positioning assembly consistent with the invention wherein the positioning assembly is supported by a optical scanning system housing.

With continued reference to FIG. 2, the assembly 40 may be supported in an opening in a system housing or bracket 42. In this configuration, the bracket may contact the sensor and/or isolator with the motor 12 located outside of an interior cavity 44 defined by the housing 42. Advantageously, heat generated by the motor is dissipated through its exterior housing 17. Housing surfaces 17a, 17b, and 17c are all fully exposed to an outside cooling medium, which is typically air but may be one or more other cooling mediums known to those skilled in the art.

The only surface 17d of the motor not exposed to an outside cooling medium is coupled to the position sensor via the thermally insulating isolator. The isolator minimizes heat transfer from the motor to the position sensor and to the bracket. The existence of the isolator between the motor and the sensor and the maximum exposure of the motor surfaces to the cooling medium result in efficient heat dissipation from the motor with minimal affects on the accuracy of the position sensor.

There is thus provided a positioning assembly wherein a motor is located on an end of the system with only one of its sides coupled to a position sensor 14 via an isolator 16. The isolator limits heat transfer from the motor to the sensor and a supporting bracket. All the other surfaces of the motor are exposed to a cooling medium such as air. This configuration substantially minimizes adverse system performance effects related to heat generated by the motor.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A positioning assembly for controlling the position of an element comprising:

a motor having an output shaft coupled to said element;

a position sensor; and a thermal isolator disposed between said motor and said sensor, said output shaft extending through said isolator and through at least a portion of said sensor.

2. A positioning assembly according to claim 1, wherein said isolator comprises a plastic.

3. A positioning assembly according to claim 2, wherein said plastic is a thermoset plastic.

4. A positioning assembly according to claim 1, wherein said isolator comprises a ceramic.

5. A positioning assembly according to claim 1, wherein said element comprises an optical element selected from the group consisting of:

mirror, waveplate, and lens.

6. A positioning assembly according to claim 1, wherein said motor is a moving magnet torque motor.

7. An optical scanner comprising:

a positioning assembly for positioning an optical element to direct light from a light source, said assembly comprising a motor having an output shaft coupled to said optical element, a position sensor, and a thermal isolator disposed between said motor and said sensor, said output shaft extending through said isolator and through at least a portion of said sensor.

8. An optical scanner according to claim 7, wherein said scanner further comprises a housing for supporting said positioning assembly, and wherein said optical element is disposed on an inside of said housing and said motor is disposed on an outside of said housing.

9. An optical scanner according to claim 7, wherein said optical element is selected from the group consisting of: mirror, waveplate, and lens.

10. An optical scanner according to claim 7, wherein said motor is a moving magnet torque motor.

11. An optical scanner according to claim 7, wherein said isolator comprises a thermoset plastic.

12. A method of constructing a positioning assembly for positioning an element comprising:

providing a motor having an output shaft;

coupling said element to said output shaft;

providing a thermal isolator; and coupling a position sensor to said motor with said output shaft extending through said isolator and at least a portion of said sensor.

13. A method according to claim 12, wherein said isolator comprises a plastic.

14. A method according to claim 13, wherein said plastic is a thermoset plastic.

15. A method according to claim 12, wherein said isolator comprises a ceramic.

16. A method according to claim 12, wherein said element comprises an optical element selected from the group consisting of: mirror, waveplate, and lens.

17. A method according to claim 12, wherein said motor is a moving magnet torque motor.

* * * * *